United States Patent
Yam et al.

(10) Patent No.: US 6,226,453 B1
(45) Date of Patent: *May 1, 2001

(54) TEMPERATURE PROBE WITH FIBER OPTIC CORE

(75) Inventors: Mark Yam, San Jose; Bruce W. Peuse, San Carlos, both of CA (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,331

(22) Filed: Sep. 16, 1997

(51) Int. Cl.[7] .................................................. H01L 21/205
(52) U.S. Cl. ...................... 392/418; 219/390; 219/405; 118/725; 374/131; 374/121
(58) Field of Search ..................... 219/390, 405, 219/411; 392/416, 418; 118/724, 725, 50.1, 730, 728; 374/121, 130, 131, 132

(56) References Cited

U.S. PATENT DOCUMENTS

| | | | | |
|---|---|---|---|---|
| Re. 33,245 | * | 6/1990 | Tojyo et al. | 374/131 |
| 4,408,827 | * | 10/1983 | Guthrie et al. | 374/131 |
| 4,468,771 | * | 8/1984 | Zhukov et al. | 374/131 |
| 4,576,486 | * | 3/1986 | Dils | 374/131 |
| 4,794,619 | * | 12/1988 | Tregay | 374/131 |
| 5,755,511 | * | 5/1998 | Peuse et al. | 374/128 |
| 5,781,693 | * | 7/1998 | Ballance et al. | 392/416 |
| 5,830,277 | | 11/1998 | Johnsgard et al. | 118/725 |
| 5,874,711 | * | 2/1999 | Champetier et al. | 392/416 |
| 6,079,874 | * | 6/2000 | Hegedus | 374/112 |

FOREIGN PATENT DOCUMENTS

| | | | |
|---|---|---|---|
| 438880 | * | 7/1991 | (EP) . |
| 2642520 | * | 8/1990 | (FR) . |
| 2045921 | * | 11/1980 | (GB) . |
| 62-105419 | | 5/1987 | (JP) . |
| 63-149528 | * | 6/1988 | (JP) . |

* cited by examiner

Primary Examiner—John A. Jeffery
(74) Attorney, Agent, or Firm—Fish & Richardson

(57) ABSTRACT

A temperature probe has a light conductor for optically transmitting temperature information to a pyrometer. The light conductor has a first portion which is adapted to capture temperature information and a second portion which is connected to the pyrometer. The probe also has an enclosure for protecting the second portion of the light conductor. The enclosure in turn has a passageway for housing the second portion of the light conductor and an opening for projecting the first portion of the light conductor from the passageway to the outside of the enclosure. Additionally, a seal is provided in the passageway adjacent the opening to encapsulate the second portion of the light conductor inside the passageway.

20 Claims, 3 Drawing Sheets

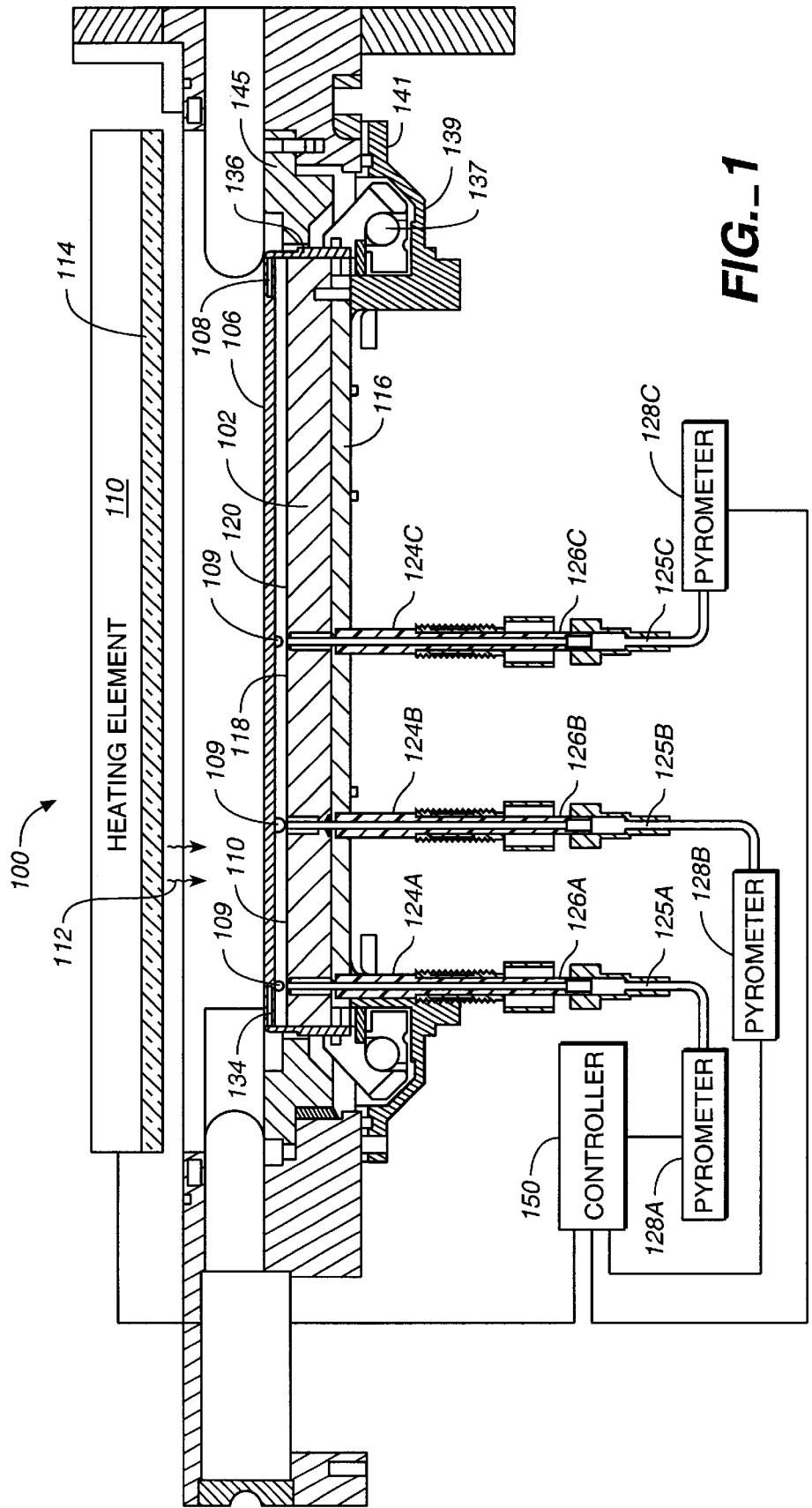
FIG._1

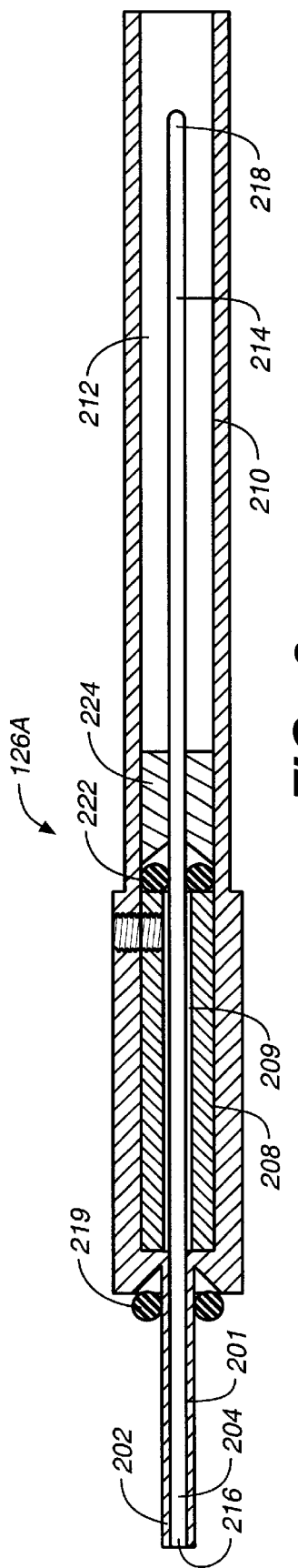
FIG._2
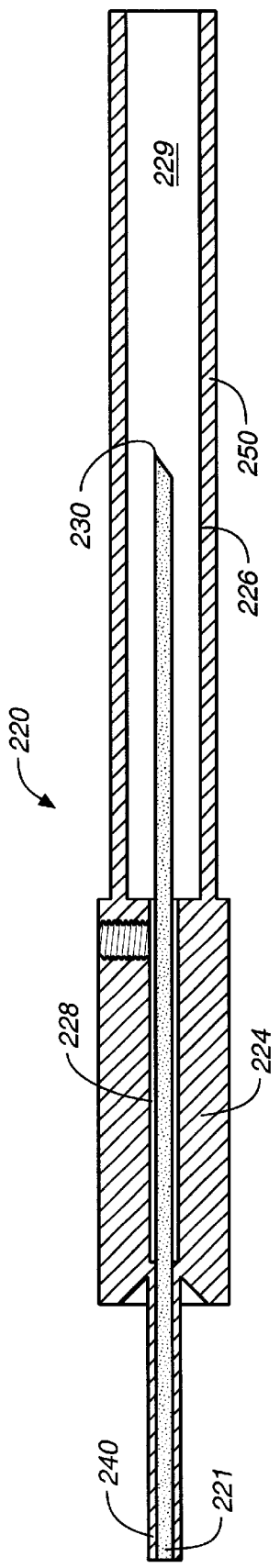
FIG._3

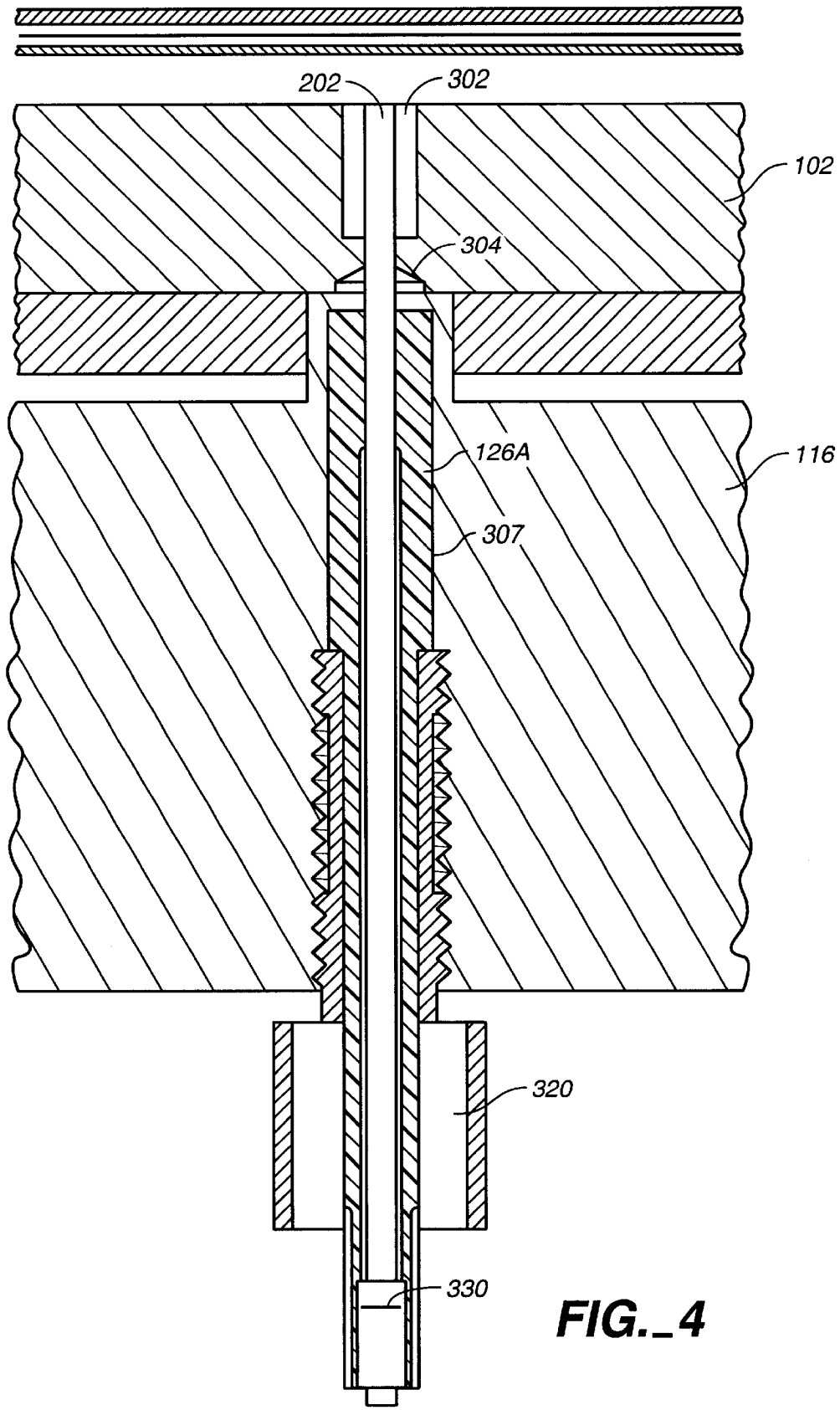
FIG._4

TEMPERATURE PROBE WITH FIBER OPTIC CORE

BACKGROUND OF THE INVENTION

The invention relates to a probe, and more particularly, to a probe for making temperature measurements of a semiconductor substrate.

Many semiconductor device manufacturing processes require a tight control of temperatures associated with a semiconductor wafer or substrate during processing to increase device performance and yield as well as to ensure process repeatability. In certain processes, if temperature differentials in the wafer rise above 1–2° C./cm at 1200° C., the resulting stress may cause slips in silicon crystals and may destroy potential semiconductor structures on the wafer. To avoid damage to the substrate and undesirable process variations, a precise temperature monitoring device for the substrate is needed.

One method for determining substrate temperature applies the principles of pyrometry. Pyrometers, or devices based on pyrometry, exploit the general property that objects emit radiation with a particular spectral content and intensity that is characteristic of their temperature. By measuring the emitted radiation, the object's temperature can be determined. In systems that incorporate pyrometers, a thermal reflector is positioned near the substrate to create a virtual black body cavity between the reflector and the substrate. Additionally, a temperature probe with a light pipe is used to sample radiation in the cavity through an aperture in the reflector. The sampled intensity is passed through an optical transmitter to the pyrometer where it is converted to temperature information. Further, to increase the precision of the temperature monitoring process, the emitted radiation intensity can be monitored via a plurality of temperature probes and pyrometers which monitor the localized regions of the substrate and perform appropriate conversions to obtain temperature. Temperature readings from various probes and pyrometers can be used for real-time control of heating elements in the rapid thermal processing (RTP) of substrates.

Conventional temperature probes typically use sapphire light pipes that pass through conduits which extend from the backside of a base of a process chamber through the top of a reflector. Although expensive, sapphire light pipes have relatively small scattering coefficients and tend to have greater transverse light rejection. These capabilities provide more accurate and localized measurements. Additionally, as sapphire is inert, light pipes made of sapphire do not suffer out-gassing problems. However, as sapphire light pipes are small (about 0.125 inch in diameter), they are relatively fragile components that can be easily chipped during handling. Chipped sapphire light pipes transmit less light to the pyrometers, resulting in inaccurate temperature readings which can adversely impact the operations of the processing equipment.

As costs associated with replacing chipped probes can quickly become a significant portion of the operating expenses, a durable, cost-effective temperature probe that can operate in a high temperature processing chamber is needed.

SUMMARY

A temperature probe provides a light conductor having first and second portions and an enclosure housing the light conductor. The enclosure provides a passageway for housing the second portion of the light conductor and an opening connecting the passageway to the exterior of the enclosure. The opening is adapted to project the first portion of the light conductor from the passageway. The enclosure also has a seal in the passageway for encapsulating the second portion of the light conductor in the passageway.

In one aspect, the light conductor is a pure silica fiber optic cable. In another aspect, the light conductor is a multi-mode fiber optic cable with a silica core and a cladding exterior. The cladding is stripped to form the first portion, while the cladding exterior remains on the second portion. Thus, for either aspect, the first portion is an exposed silica portion while the second portion may be the silica core or the cladding exterior.

In another aspect of the invention, a high temperature epoxy is used to seal the passageway. In yet another aspect, one or more O-rings may be mounted in the passageway to insulate the passageway from the exterior of the enclosure. Additionally, a ferrule may be positioned between the second portion and the walls of the enclosure to provide the sealing function.

Among the advantages of the invention are the following. The temperature probe is more durable as only a short segment of the light transmitter extends from the opening while the rest of the light conductor is protected inside the enclosure. Because the short segment is structurally supported by the enclosure, it is rendered more rigid and less prone to chipping. Further, the seal insulates the second portion inside the enclosure from the environment of the process chamber. The resulting temperature probe is less expensive, easier to handle and more rugged.

Other features and advantages will be apparent from the following description and from the claims.

BRIEF DESCRIPTION OF THE DRAWINGS

FIG. 1 is a cross-sectional side view of an RTP system;

FIG. 2 is an enlarged cross-section side view showing details of a probe of FIG. 1;

FIG. 3 is an enlarged cross-section side view showing details of another embodiment of the probe of FIG. 1; and FIG. 4 is an enlarged cross-section side view showing details of a probe mounted in the system of FIG. 1.

DESCRIPTION

In the following description, the term "substrate" is intended to cover broadly any object that is being processed in a thermal process chamber and the temperature of which is being measured during processing. The term "substrate" includes, for example, semiconductor wafers, flat panel displays, and glass plates or disks.

FIG. 1 shows an RTP system with a plurality of temperature probes 126A, 126B and 126C. The RTP system includes a process chamber 100 for processing a substrate 106. The substrate 106 is mounted inside the chamber 100 on a substrate support structure 108 and is heated by a heating element 110 located directly above the substrate. The heating element 110 generates radiation 112 which enters the process chamber 100 through a water-cooled quartz window assembly 114 above the substrate 106. The backside of quartz window 114 is ideally coated with an inert material which is transparent to thermal radiation in all but this narrow band of wavelengths, thereby reducing the likelihood that the heat source will introduce stray radiation into the reflecting cavity.

Beneath the substrate 106 is a reflector 102 which is mounted on a water-cooled, stainless steel base 116. Reflector 102 may be made of aluminum and may have a highly reflective surface coating 120. The underside of substrate 106 and the top of reflector 102 form a reflecting cavity 118 for enhancing the effective emissivity of the substrate.

The temperatures at localized regions 109 of substrate 106 are measured by the plurality of temperature probes 126A, 126B and 126C. The temperature probe 126A is positioned within a conduit 124A so that its uppermost end is flush with or slightly below the top of the reflector 102. The other end of the temperature probe 126A is connected to a flexible optical fiber 125A that transmits sampled light from the substrate 106 to a pyrometer 128A. The remaining temperature probes 126B and 126C are similarly connected via optical fibers 125B and 125C through conduits 124B and 124C to pyrometers 128B and 128C, respectively. The output of the pyrometers 128A, 128B and 128C are sensed by a digital controller 150, which in turn drives the heating element 110 to appropriately adjust the temperature in the chamber 100. In the described embodiment, each of the pyrometers 128A–128C has a narrow bandwidth (e.g. about 40 nm) located at about 950 nm.

Referring back to the reflector 102, the highly reflective multi-layered coating 120 is formed on top of the reflector 102. The bottom layer of the coating 102 is a thin layer of gold, which is deposited onto the surface of the reflector body. Gold is preferred because it has a reflectivity of about 0.975 in the infra-red wavelength range of interest (i.e., about 950 nm). To further enhance the reflectivity of the gold layer, a quarter-wave stack is formed on top of the gold layer. The quarter-wave stack is made up of alternating dielectric layers which have different indices of refraction and has a thickness equal to one-quarter of the wavelength to which the pyrometer is most sensitive (e.g., one-quarter of 950 nm). If gold is an unacceptable material for reflecting purposes, other reflecting materials may also be used. Other types of suitable coatings are disclosed in U.S. application Ser. No. 08/845,931, filed Apr. 29, 1997, entitled "REFLECTOR HAVING A METALLIC BONDING LAYER FOR A SEMICONDUCTOR PROCESSING CHAMBER" and U.S. application Ser. No. 08/697,633, filed Aug. 28, 1996, entitled "REFLECTOR FOR A SEMICONDUCTOR PROCESSING CHAMBER", both of which are assigned to the assignee of the present invention and hereby incorporated by reference.

The top layer of the multi-layered structure is a passivation layer, which prevents the gold of the reflecting layer from possibly contaminating the RTP chamber. The passivation layer may be made of silicon dioxide, aluminum oxide, silicon nitride, or any other acceptable material that will passivate the reflecting layer without degrading its reflective properties at the wavelength of interest.

The separation between the substrate 106 and reflector 102 may be approximately 0.3 inch (7.6 mm), thus forming a cavity which has a width-to-height ratio of about 27. In processing systems that are designed for eight-inch (300 mm) silicon wafers, the distance between the substrate 106 and reflector 102 is between 3 mm and 9 mm, and ideally between 5 mm and 8 mm. Moreover, the width-to-height ratio of cavity 118 should be larger than about 20:1. If the separation is made too large, the emissivity-enhancement effect that is attributable to the virtual black body cavity that is formed will decrease. On the other hand, if the separation is too small, e.g., less than about 3 mm, then the thermal conduction from the substrate to the cooled reflector will increase, thereby imposing an unacceptably large thermal load on the heated substrate. Since the main mechanism for heat loss to the reflector or reflecting plate will be conduction through the gas, the thermal loading will depend up the type of gas and the chamber pressure during processing.

During thermal processing, the support structure 108 can be rotated. Thus, each of probes 126A–126C can sample the temperature profile of a corresponding annular ring area on the substrate 106. The temperature indications associated with each probe 126A–126C may be corrected according to the individual sensitivity to variations in emissivity associated with the probe location using methods such as that disclosed in U.S. patent application Ser. No. 08/641,477, entitled "METHOD AND APPARATUS FOR MEASURING SUBSTRATE TEMPERATURES", filed on May 1, 1996, assigned to the assignee of the present invention, and hereby incorporated by reference.

The support structure which rotates the substrate includes a support ring 134 which contacts the substrate 106 around the substrate's outer perimeter, thereby leaving all of the underside of the substrate 106 exposed except for a small annular region about the outer perimeter. The support ring 134 may have a radial width of approximately one inch (2.5 cm). To minimize the thermal discontinuities that will occur at the edge of substrate 106 during processing, the support ring 134 may be made of the same, or similar, material as the substrate, e.g., silicon or silicon carbide.

The support ring 134 rests on a rotatable tubular quartz cylinder 136 that is coated with silicon to render it opaque in the frequency range of pyrometers 128A–128C. The silicon coating on the cylinder 130 acts as a baffle to block out radiation from external sources that might contaminate the intensity measurements. The bottom of the quartz cylinder is held by an annular upper bearing race 141 which rests on a plurality of ball bearings 137 that are, in turn, held within an stationary, annular, lower bearing race 139. The ball bearings 137 may be made of steel and coated with silicon nitride to reduce particulate formation during operation. An upper bearing race 141 is magnetically-coupled to an actuator (not shown) which rotates the cylinder 136, the support ring 134 and the substrate 106 during thermal processing.

The support ring 134 is designed to create a light tight seal with the cylinder 136. Extending from the bottom surface of the support ring 134 is a cylindrically shaped lip which has an outside diameter that is slightly smaller than the inside diameter of the cylinder 136, so that it fits into the cylinder 136, as shown, and forms a light seal. On the inside region of the support ring, there is a shelf for supporting substrate 106. The shelf is a region around the inside circumference of the support ring that is lower than the rest of the support ring.

A purge ring 145 which is fitted into the chamber body surrounds the cylinder 136. The purge ring 145 has an internal annular cavity which opens up to a region above upper bearing race 141. The internal cavity is connected to a gas supply through a passageway. During processing, a purge gas is delivered to the chamber through the purge ring 145.

The support ring 134 has an outer radius that is larger than the radius of the cylinder 136 so that it extends out beyond the cylinder. The annular extension of the support ring beyond the cylinder 136, in cooperation with the purge ring 145 located below it, functions as a baffle which prevents stray light from entering the reflecting cavity at the backside of the substrate 106. To further reduce the possibility of stray light reflecting into the reflecting cavity, the support ring 134 and the purge ring 145 may also be coated with a material that absorbs the radiation generated by heating element 110 (e.g., a black or grey material).

Referring now to FIG. 2, details of one of the temperature probes 126A–126C deployed in FIG. 1 are shown. In FIG.

2, the representative temperature probe 126A houses a light conductor 214 with first and second end portions 216 and 218, respectively. The light conductor 214 has a diameter of about 0.4 inch. In one embodiment, the light conductor 214 can be a one millimeter wavelength, multi-mode, fiber optic cable available from 3M Corporation of West Haven, Conn. The multi-mode fiber optic cable has a core made of quartz silica and a cladding made of a sheath of a low-temperature polymer. Although the silica core can withstand the high temperature of the chamber 100, exposing the polymer to the high temperature environment of the chamber 100 would result in an effect known as "clouding", where the polymer degrades via evaporation and renders the fiber optic cable unusable.

To protect the fiber optic cable against the high temperature associated with the operation of the chamber 100, the cladding of the fiber optic cable is stripped away to expose the fiber optic core. Specifically, about 0.1 inch of the cladding material is removed to expose the core material of the fiber optic cable. This core thus forms the first end portion 216, which is eventually inserted through one of conduits 124A–124C to capture temperature information from localized regions 109. Further, the second end portion 218 remains protected in an enclosure 201, as described below. In this manner, only the silica core is exposed to collect high intensity radiation from the heated substrate 106 while the polymer sheath is protected from the high temperature.

The enclosure 201 which houses the light conductor 214 is made up of a tip 202, a body 208 and a tail 210. The first end portion 216 of the light conductor 214 is adapted to be housed in the tip 202, which has an inner passageway 204 where the first end portion 216 is received. The tip 202 is approximately 0.1 inch long with an outside diameter of approximately 0.08 inch. Further, the inner passageway 204 has a diameter of approximately 0.04 inch.

The tip 202 protrudes from the body 208, which may be made of stainless steel. The body 208 may have an outside diameter of approximately 0.3 inch and a length of approximately 0.9 inch. Further, the body 208 may have a body passageway 209 which is linearly aligned with the inner passageway 204. At the interface with the inner passageway 204, the body passageway 209 may have a diameter of approximately 0.04 inch, while at the other end, the body passageway 209 has a diameter of about 0.06 inch. The increase in diameter for the passageway 209 provides flexibility in inserting and mounting of the light conductor 214.

Once the light conductor 214 has been inserted and mounted nearly flushed against the end of the tip 202, a sealing system is provided to protect the interior of the chamber 100 from contamination. An O-ring 219 may be mounted outside the junction between the tip 202 and the body 208, or an O-ring 222 may also be mounted in the passageway 209. Additionally, a ferrule 224 can be positioned at the beginning of the passageway 212 to provide another seal. The O-ring 219 and ferrule thus prevent contaminants from reaching the chamber 100 during operation of the equipment. Additionally, the O-ring 219 and ferrule 224 prevent contaminants from disrupting the optics associated with the light conductor 214.

The O-rings and ferrule are made of Viton™ and are available from Bay Seal Company of Hayward, Calif. Alternatively, in place of the O-rings 219 and/or 222 and the ferrule 224, a high temperature epoxy, such as EPO-TEK 370, available from Epoxy Technology, Billerica, Mass., may be used to fill the tip passageway 204 containing the cable 214 to secure the first portion 216 of the cable 214. Moreover, the epoxy can be applied to the passageway 209 to secure the cable 214 within the body 208.

Further, the body 208 is connected to the tail 210 with the passageway 212. The passageway 212 houses the second end portion 218 of the light conductor 214, which is eventually connected to one of the pyrometers 128A, 128B or 128C.

Referring now to FIG. 3, a second temperature probe 220 is shown. In this embodiment, an all silica fiber optic cable 230 is enclosed in a tip 240 with a suitable high temperature epoxy. The silica fiber optic cable 230 is further protected by a housing 250. The all silica fiber optic cable, such as a WFGE 1000/1100 HPN fiber assembly, is available from CeramOptec Inc. of East Longmeadow, Mass. As the all silica fiber optic cable does not have a polymer cladding which can degrade at high temperatures, the cable 230 only needs to be mounted inside the tip 240 and the housing 250 to protect it against physical damage. In FIG. 3, the temperature probe tip 240 is connected to a body 224, which in turn is connected to a tail portion 226. The tip 240, body 224 and tail 226 are connected via passageways 221, 228 and 229, respectively.

During assembly, the cable 230 is initially inserted through the tail 226 and the passageway 221, and is fitted flushed against the open end of the tip 240. Next, the fiber 230 may be secured by injecting a high temperature epoxy, as discussed above, into the passageway 221 of the tip 240. Further, a low temperature epoxy may be injected into the passageway 228 of the body 224. Alternatively, as discussed above, suitable O-rings and ferrule may be used in place of the epoxy to insulate the chamber 100 from contaminants.

Turning now to FIG. 4, the mounting of the temperature probe of FIG. 2 or 3 in the chamber 100 is illustrated. In FIG. 4, a temperature probe 126A is inserted through a passage 307 that extends from the backside of the stainless steel base 116 through the top of the stainless steel base 116. Further, a tip 202 of the probe 126A passes through a countersink 304 and a reflector passage 302 in the reflector 102. A locking nut 320 securely clamps the probe 126A to the base 116. An end portion 330 of the probe 126A provides a connection to the flexible optical fiber 125A that transmits light to the pyrometer 128A.

Although fiber optic cables are used, light pipes can also be made from any other suitable tubular material having a highly polished reflective inner surface. Further, the light pipes can be made of any appropriate heat-tolerant and corrosion-resistant materials, such as quartz, that can transmit the sampled radiation to the pyrometer.

Other embodiments are within the scope of the following claims.

What is claimed is:

1. A temperature probe, comprising:
   a light conductor having first and second portions wherein at least the first portion of the light conductor includes only an optic core portion; and
   an enclosure for the light conductor having:
   a housing to encompass the entire length of the first portion of the light conductor;
   a passageway through the housing;
   an opening connecting the passageway to an exterior of the housing, the opening being adapted to project the first portion of the light conductor toward an environment within a reflecting cavity of a thermal processing chamber to sample radiation therein; and
   a seal mounted to protect the second portion of the light conductor from the environment within the reflecting cavity.

2. The temperature probe of claim 1, wherein the light conductor is a fiber optic cable.

3. The temperature probe of claim 2, wherein the fiber optic cable is a silica cable.

4. The temperature probe of claim 2, wherein the first portion of the fiber optic cable is a stripped silica portion and the second portion is a cladded portion.

5. The temperature probe of claim 4, further comprising a ferrule mounted on the second portion of the light conductor.

6. The temperature probe of claim 1, wherein the seal is an O-ring.

7. The temperature probe of claim 1, wherein the seal is an epoxy.

8. The temperature probe of claim 1, further comprising a ferrule mounted on the second portion of the light conductor.

9. A rapid thermal processing system for heating a substrate, comprising:
   a heater mounted adjacent a first side of the substrate;
   a reflector mounted adjacent a second side of the substrate to form a reflecting cavity;
   one or more temperature probes positioned in the reflector, each of the temperature probes including:
      a light conductor having first and second portions wherein at least the first portion of the light conductor includes only an optic core portion; and
      an enclosure for the light conductor having:
         a housing to encompass the entire length of the first portion of the light conductor;
         a passageway through the housing;
         an opening connecting the passageway to the exterior of the housing, the opening being adapted to project the first portion of the light conductor toward the reflecting cavity to sample radiation therein; and
         a seal to isolate the second portion of the light conductor from an environment within the reflecting cavity;
   a pyrometer coupled to the one or more temperature probes; and
   a controller coupled to the pyrometer and to the heater for adjusting the temperature of the substrate.

10. The rapid thermal processing system of claim 9, wherein the light conductor is a fiber optic cable.

11. The rapid thermal processing system of claim 10, wherein the fiber optic cable is a silica cable.

12. The rapid thermal processing system of claim 10, wherein the first portion of the fiber optic cable is a stripped silica portion and the second portion is a cladded portion.

13. The rapid thermal processing system of claim 9, wherein the seal is an O-ring.

14. The rapid thermal processing system of claim 9, wherein the seal is an epoxy.

15. The rapid thermal processing system of claim 9, further comprising a ferrule mounted on the second portion of the light conductor.

16. A method for making a temperature probe, comprising:
   providing first and second portions of a fiber optic cable wherein at least the first portion includes only an optic core portion;
   extending the first portion through a housing to project toward an environment within a reflecting cavity of a thermal processing chamber at an exterior of the housing; and
   providing a seal to isolate the second portion from the environment.

17. The method of claim 16, wherein the first portion includes an exposed core and wherein the forming step further comprises stripping the fiber optic cable to reveal the core.

18. The method of claim 16, wherein the sealing step further comprises applying a high temperature epoxy to the second portion.

19. The method of claim 16, wherein the providing step further comprises applying an O-ring about the second portion.

20. The method of claim 19, wherein the applying step further comprises applying a ferrule about the second portion.

* * * * *